(12) United States Patent
Aga

(10) Patent No.: US 12,479,716 B2
(45) Date of Patent: Nov. 25, 2025

(54) VIBRATION DEVICE, SPEAKER UNIT, AND METHOD FOR MANUFACTURING VIBRATION DEVICE

(71) Applicant: Hisanori Aga, Tokyo (JP)

(72) Inventor: Hisanori Aga, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 132 days.

(21) Appl. No.: 18/627,888

(22) Filed: Apr. 5, 2024

(65) Prior Publication Data

US 2024/0359970 A1    Oct. 31, 2024

(30) Foreign Application Priority Data

Apr. 27, 2023 (JP) .................................. 2023-073470

(51) Int. Cl.
  *H04R 17/00* (2006.01)
  *B81B 3/00* (2006.01)
  *B81C 1/00* (2006.01)

(52) U.S. Cl.
  CPC ........ *B81B 3/0078* (2013.01); *B81C 1/00158* (2013.01); *B81B 2201/0257* (2013.01); *B81B 2203/0127* (2013.01); *B81B 2203/04* (2013.01); *B81C 2201/013* (2013.01)

(58) Field of Classification Search
  CPC ............................ H04R 17/00; H04R 17/005; H04R 2201/003; B81B 2201/0257; B81B 2201/032; B81B 3/0021
  See application file for complete search history.

(56) References Cited

U.S. PATENT DOCUMENTS

| | | | |
|---|---|---|---|
| 9,980,051 B2* | 5/2018 | Clerici | B81B 3/0037 |
| 10,003,008 B2* | 6/2018 | Fanget | H04R 3/002 |
| 10,349,182 B2* | 7/2019 | Stoppel | H04R 17/00 |
| 11,711,653 B2* | 7/2023 | Lo | B81B 3/0013 |
| | | | 381/150 |
| 11,884,535 B2* | 1/2024 | Liang | B81B 3/0021 |
| 12,363,484 B2* | 7/2025 | Zhou | H10N 30/88 |
| 2018/0139543 A1 | 5/2018 | Clerici et al. | |
| 2023/0174369 A1* | 6/2023 | Rusconi Clerici Beltrami | |
| | | | H04R 31/006 |
| 2024/0284121 A1* | 8/2024 | Ikeuchi | H04R 17/10 |
| 2024/0365048 A1* | 10/2024 | Chen | H04R 1/025 |

\* cited by examiner

*Primary Examiner* — Ryan Robinson
(74) *Attorney, Agent, or Firm* — IPUSA, PLLC (57) ABSTRACT

A vibration device includes a substrate, a first drive source, a second drive source, and a membrane. The membrane includes a main portion extending in an in-plane direction, and a damper protruding in a direction perpendicular to a plane of the membrane. The main portion includes a first region disposed on the first drive source, a second region disposed on the second drive source, and a third region disposed between the first region and the second region. The damper includes a first portion connecting the first region and the third region, and a second portion connecting the second region and the third region.

7 Claims, 11 Drawing Sheets

VIBRATION DEVICE, SPEAKER UNIT, AND METHOD FOR MANUFACTURING VIBRATION DEVICE

CROSS-REFERENCE TO RELATED APPLICATIONS

This application claims priority under 35 U.S.C. § 119 to Japanese Patent Application No. 2023-073470, filed Apr. 27, 2023, the contents of which are incorporated herein by reference in its entirety.

BACKGROUND

1. Technical Field

The present disclosure relates to a vibration device, a speaker unit, and a method for manufacturing the vibration device.

2. Description of the Related Art

Vibration devices, such as micro electro mechanism systems (MEMS) sound transducers that are fabricated by micromachining techniques in MEMS, are developed.

Patent Document 1 discloses a vibration device including a planar MEMS actuator, a membrane that moves in response to vibration caused by the MEMS actuator, a membrane plate for reinforcing the membrane, and a membrane frame that spans the membrane.

RELATED-ART DOCUMENT

Patent Document

Patent Document 1: U.S. Patent Application Publication No. 2018/139543

SUMMARY

A vibration device includes a substrate, a first drive source disposed on the substrate and configured to vibrate the substrate, a second drive source disposed on the substrate and being away from the first drive source on the substrate, the second drive source being configured to vibrate the substrate, and a membrane disposed on the first drive source and the second drive source and extending from the first drive source toward the second drive source. The membrane includes a main portion extending in an in-plane direction, and a damper protruding in a direction perpendicular to a plane of the membrane. The main portion includes a first region disposed on the first drive source, a second region disposed on the second drive source, and a third region disposed between the first region and the second region. The damper includes a first portion connecting the first region and the third region, and a second portion connecting the second region and the third region.

DETAILED DESCRIPTION

The inventor of this application has recognized the following information relating to the related art. Sound elements that include a membrane, a membrane plate, and a membrane frame as disclosed in Patent Document 1 is disposed at a distance over a MEMS actuator. In this case, the size of a vibration device is increased. In addition, the membrane is physically constrained by the membrane plate and the membrane frame, and as a result, displacement of the membrane in response to vibration by the MEMS actuator may be suppressed.

In view of the situation recognized by the inventor, an object of the present disclosure is to provide a vibration device, a speaker unit, and a method for manufacturing the vibration device that is made compact and prevents the suppression of the displacement of a membrane.

Hereinafter, various embodiments of the present disclosure will be described with reference to the drawings. In the drawings, the same components may be denoted by the same reference numerals. In the description of the drawings, the same components as components described earlier may be omitted.

In each drawing, orthogonal coordinates having an X axis, a Y axis, and a Z axis are used as direction expressions. The X axis, the Y axis, and the Z axis are orthogonal to one another. An X direction along the X axis indicates a width direction of a vibration device according to the embodiments. A Y direction along the Y axis indicates a depth direction of the vibration device according to the embodiments. A Z direction along the Z axis indicates a thickness direction of the vibration device according to the embodiments. In each of the X direction, the Y direction, and the Z direction, a side to which an arrow is directed is referred to as a "+side," and a side opposing the +side is referred to as a "−side." The X direction and the Y direction may be referred to as "in-plane directions." The Z direction may be referred to as a "direction perpendicular to a plane." However, these do not limit the orientation of the vibration device according to the embodiments during use, and the orientation of the vibration device according to the embodiments is arbitrary.

Overall Configuration

Figure 1:
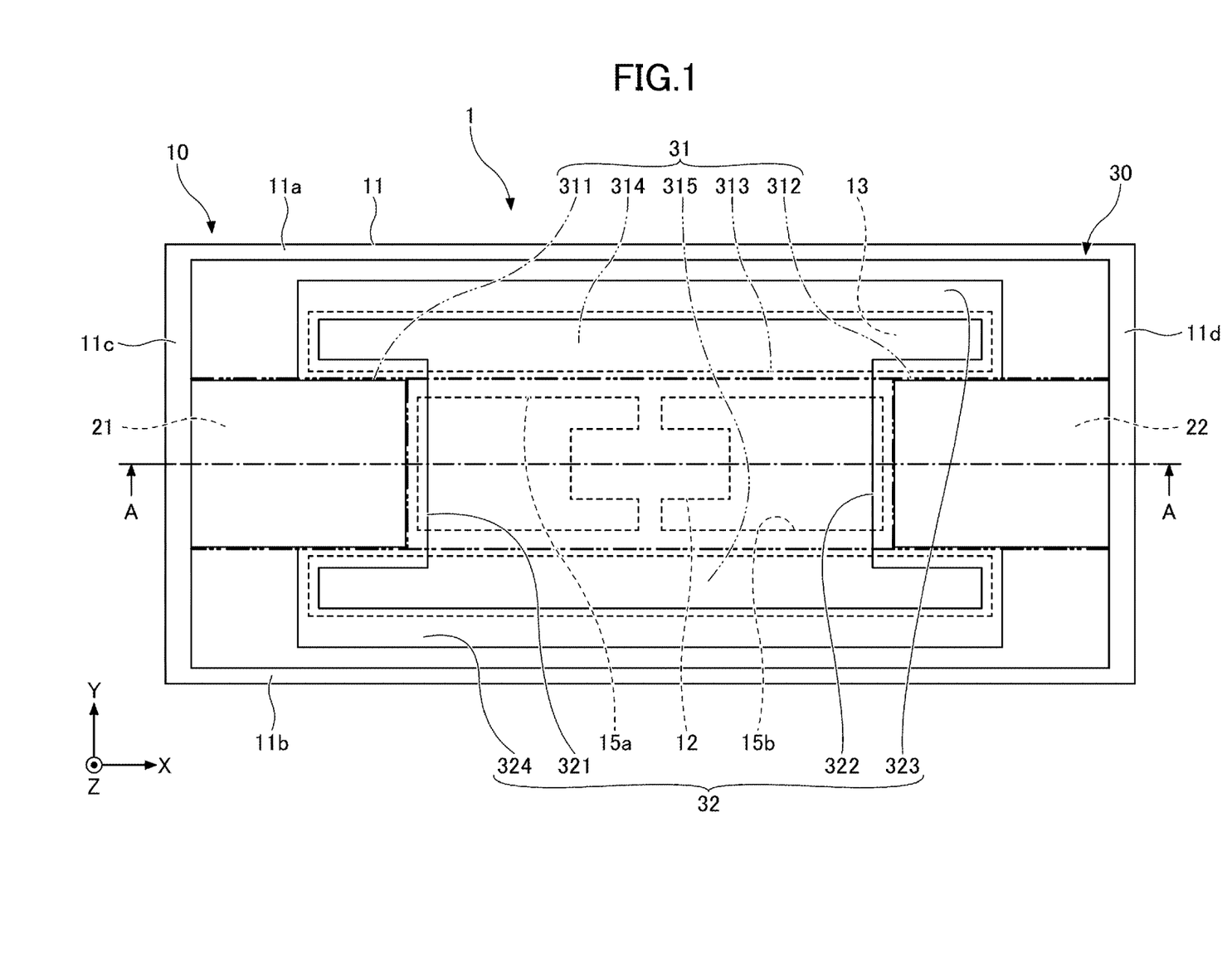
FIG. 1 is a plan view of a vibration device according to an embodiment.
Figure 2:
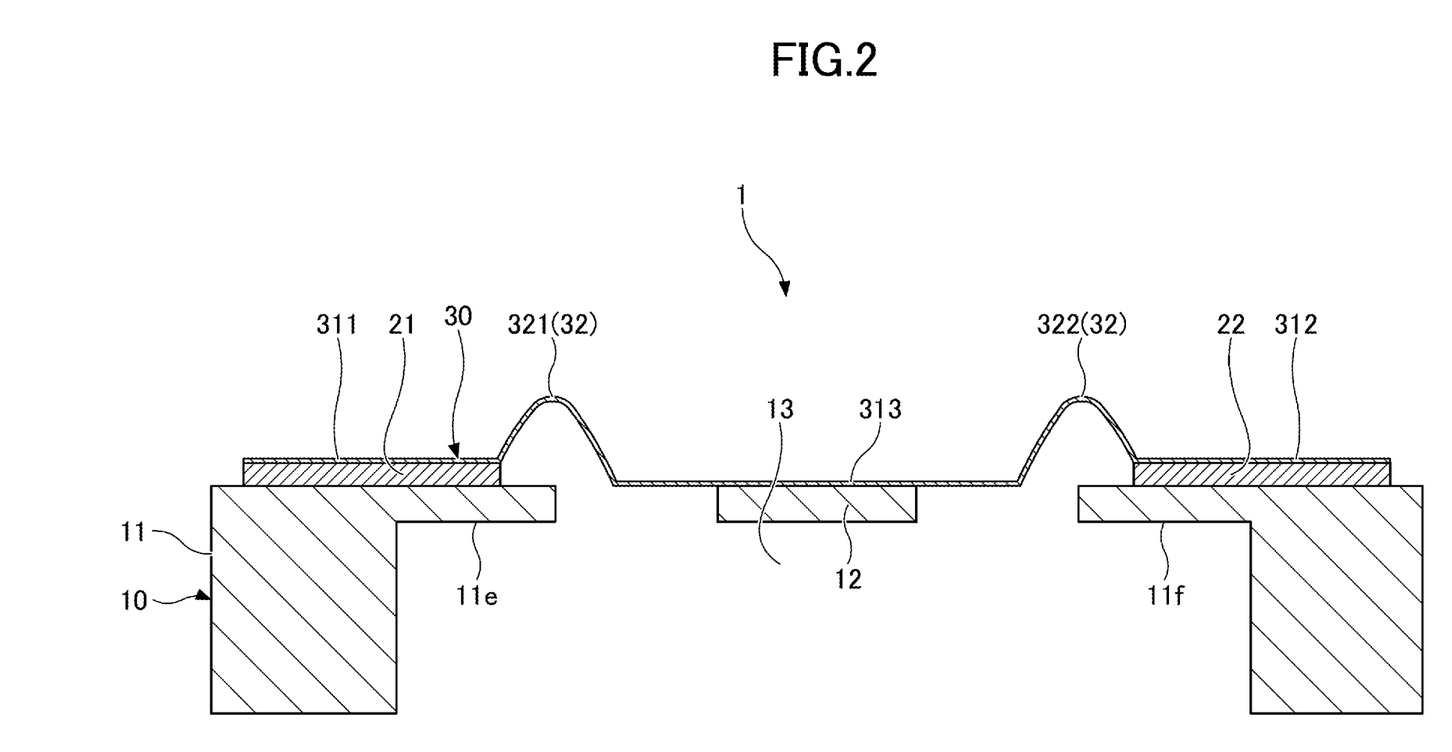
FIG. 2 is a cross-sectional view of the vibration device taken along the line A-A in FIG. 1 according to the embodiment.

An example of the overall configuration of a vibration device 1 according to one embodiment will be described with reference to FIGS. 1 and 2. FIG. 1 is a plan view of the vibration device 1 according to the embodiment. FIG. 2 is a cross-sectional view of the vibration device 1 taken along the line A-A in FIG. 1.

The vibration device 1 is used as a sound transducer that converts an electric signal to a sound wave having a predetermined frequency. The vibration device 1 can be applied, for example, as a sound source for a speaker unit that is to be worn on an ear of a user. The speaker unit with the vibration device 1 preferably further includes a housing that houses the vibration device 1. However, the use of the vibration device 1 is not limited to the above example.

As shown in FIGS. 1 and 2, the vibration device 1 includes a substrate 10, a first piezoelectric layer 21, a second piezoelectric layer 22, and a membrane 30. Although not shown in the vibration device 1, each of the first piezoelectric layer 21 and the second piezoelectric layer 22 includes electrodes used for receiving and outputting electric signals. The electrodes may be provided at appropriate positions of the substrate 10, for example. However, the position of each electrode is not limiting. The first piezoelectric layer 21 is an example of a "first drive source." The second piezoelectric layer 22 is an example of a "second drive source."

Hereinafter, the configuration of the substrate 10 will be described. The substrate 10 is a member serving as a base of the vibration device 1. The substrate 10 according to the present embodiment is obtained by etching or the like in which a planar SOI (silicon on insulator) substrate is formed to a desired shape. However, the substrate 10 is not limited to the above example, and may be formed of a Si (silicon) substrate, a sapphire substrate, an alumina substrate, a spinel substrate, a quartz substrate, a crystal substrate, a glass substrate, a ceramic substrate, or the like. Among these substrates, the SOI substrate or the Si substrate is preferably used as the substrate 10 from the viewpoint of easy micromachining.

As shown in FIG. 1, the substrate 10 includes a frame 11, two beams 15a and 15b that are provided inside the frame 11, and a piece-like portion 12 that is supported by the beams 15a and 15b. However, a structure of the substrate 10 is not limited to the above example as long as a free vibration of the membrane 30 in response to vibration of the first piezoelectric layer 21 and the second piezoelectric layer 22 is secured. In addition, from the viewpoint of simplification of the configuration, ease of processing, and the like, the frame 11, the beams 15a and 15b, and the piece-like portion 12 are preferably structurally integrated, but these may be used as separate members.

The frame 11 has a frame structure and a rectangular planar shape. However, the planar shape of the frame 11 is not limited to a rectangle, and may be any other shape such as a circle, an ellipse, a triangle, or a polygon having five or more sides.

As shown in FIGS. 1 and 2, the frame 11 according to the present embodiment includes a first long side portion 11a, a second long side portion 11b, a first short side portion 11c, a second short side portion 11d, a first thin piece portion 11e, and a second thin piece portion 11f. In addition, an opening 13 is formed in a region that is surrounded by the first long side portion 11a, the second long side portion 11b, the first short side portion 11c, the second short side portion 11d, the first thin piece portion 11e, and the second thin piece portion 11f.

The first long side portion 11a and the second long side portion 11b are band-shaped portions each of which extends in the X direction. The first long side portion 11a and the second long side portion 11b that are separated from each other are disposed opposite to each other such that the opening 13 is interposed between these long side portions 11a and 11b.

The first short side portion 11c and the second short side portion 11d are band-shaped portions each of which extends in the Y direction. The length of each of the first short side portion 11c and the second short side portion 11d is shorter than the length of each of the first long side portion 11a and the second long side portion 11b. The first short side portion 11c and the second short side portion 11d that are separated from each other are disposed opposite to each other such that the opening 13 is interposed between these short side portions 11c and 11d.

The first short side portion 11c connects both one end of the first long side portion 11a located on the −side in the X direction and one end of the second long side portion 11b located on the −side in the X direction. The second short side portion 11d connects both the other end of the first long side portion 11a located on the +side in the X direction and the other end of the second long side portion 11b located on the +side in the X direction.

As shown in FIG. 2, the first thin piece portion 11e protrudes from an inner edge of the first short side portion 11c toward the +side in the X direction. The first thin piece portion 11e is a flexible plate-like portion. As shown in FIG. 2, the first thin piece portion 11e overlaps an end side of the first piezoelectric layer 21. The end side of the first thin piece portion 11e deflects in a direction perpendicular to the plane, in response to the vibration of the first piezoelectric layer 21.

The second thin piece portion 11f protrudes from an inner edge of the second short side portion 11d toward the −side in the X direction. The second thin piece portion 11f is a flexible plate-like portion. As shown in FIG. 2, the second thin piece portion 11f is provided at a position facing the first thin piece portion 11e. The second thin piece portion 11f overlaps an end side of the second piezoelectric layer 22. The end side of the second thin piece portion 11f deflects in the direction perpendicular to the plane, in response to the vibration of the second piezoelectric layer 22.

Each of the beams 15a and 15b is a flexible member having a long thin plate shape. The beam 15a extends in the X direction, and spans the first thin piece portion 11e and the second thin piece portion 11f. The beam 15b extends in the X direction, as does the beam 15a. The beam 15b spans the first thin piece portion 15e and the second thin piece portion 11f, at a position that is different from the beam 15a. The beam 15b is disposed opposite the beam 15a such that the piece-like portion 12 is interposed between the beams 15a and 15b.

The piece-like portion 12 is disposed in a region that is surrounded by the first thin piece portion 11e, the second thin piece portion 11f, and the beams 15a and 15b. The piece-like portion 12 according to the present embodiment is a planar member having rigidity and flexibility. The piece-like portion 12 according to the present embodiment has a rectangular planar shape. However, the form of the piece-like portion 12 is not limited to the above example.

As shown in FIG. 2, the piece-like portion 12 is bonded to, for example, a middle portion (for example, the third region 313 to be described separately) of the membrane 30. When the piece-like portion 12 is bonded to the membrane 30, the membrane 30 can be prevented from vibrating independently in phase that is different from phase of the vibration of the first piezoelectric layer 21 and the second piezoelectric layer 22. With this arrangement, the membrane 30 can vibrate at a resonance frequency of the first piezoelectric layer 21 and the second piezoelectric layer 22. Thus, a sound wave in a desired range can be appropriately generated.

Hereinafter, the configuration of the first piezoelectric layer 21 and the second piezoelectric layer 22 will be described. The first piezoelectric layer 21 and the second piezoelectric layer 22 are layers each of which includes a piezoelectric material that converts applied electrical energy to mechanical energy. The first piezoelectric layer 21 and the second piezoelectric layer 22 function as a vibration source of the vibration device 1. The first piezoelectric layer 21 and the second piezoelectric layer 22 vibrate at resonance in the direction perpendicular to the plane, in response to receiving the AC signal. The first piezoelectric layer 21 and the second piezoelectric layer 22 vibrate the substrate 10.

As each of the first piezoelectric layer 21 and the second piezoelectric layer 22, a piezoelectric thin film that includes zinc oxide (ZnO), aluminum nitride (AlN), and lead zirconate titanate (PZT), and the like is used. Each of the first piezoelectric layer 21 and the second piezoelectric layer 22 may be a unimorph type piezoelectric layer that is formed by a single-layer piezoelectric film. Further, each of the first piezoelectric layer 21 and the second piezoelectric layer 22 may be a bimorph type piezoelectric layer that is formed by different two piezoelectric films.

The first piezoelectric layer 21 is disposed on the surface of the substrate 10. Specifically, the first piezoelectric layer 21 is disposed to extend from the first long side portion 11a toward the first thin piece portion 11e of the frame 11.

The second piezoelectric layer 22 is disposed on the substrate 10 at a position away from the first piezoelectric layer 21. Specifically, the second piezoelectric layer 22 is disposed to extend from the second long side portion 11b toward the second thin piece portion 11f of the frame 11. The first piezoelectric layer 21 and the second piezoelectric layer 22 face each other such that the piece-like portion 12 is interposed between the first piezoelectric layer 21 and the second piezoelectric layer 22.

The first piezoelectric layer 21 and the second piezoelectric layer 22 are electrically connected to respective different electrodes. When receiving electric signals from the respective electrodes, the first piezoelectric layer 21 and the second piezoelectric layer 22 vibrate at a predetermined resonance frequency.

Hereinafter, the configuration of the membrane 30 will be described. The membrane 30 is a flexible film-like member. The membrane 30 according to the present embodiment is formed of resin. However, the material of the membrane 30 is not limited to the above example, and may include, for example, rubber, ceramics, or a metal that has flexibility.

As shown in FIG. 1, the planar shape of the membrane 30 according to the present embodiment is rectangular, but is not limited to the above example. The planar shape of the membrane 30 may include any other shape, such as a circle, an ellipse, a triangle, or a polygon having five or more sides.

The membrane 30 extends from the first piezoelectric layer 21 towards the second piezoelectric layer 22. The membrane 30 vibrates in response to the vibration of the first piezoelectric layer 21 and the second piezoelectric layer 22. With this arrangement, for example, the sound wave at a frequency in an audible range that corresponds to the resonance frequency of the first piezoelectric layer 21 and the second piezoelectric layer 22 is generated.

The membrane 30 includes a main portion 31 and a damper 32. The main portion 31 is a portion of the membrane 30 that extends toward the plane. That is, the main portion 31 is a portion of the membrane 30 that extends in the in-plane direction. The damper 32 is a portion of the membrane 30 that protrudes in the direction perpendicular to the surface of the membrane 30. The main portion 31 and the damper 32 are preferably structurally integrated from the viewpoint of simplification of the configuration, ease of machining, and the like, but the main portion 31 and the damper 32 may be used as separate members.

As shown in FIGS. 1 and 2, the main portion 31 includes a first region 311 disposed on the first piezoelectric layer 21, a second region 312 disposed on the second piezoelectric layer 22, and a third region 313 disposed between the first region 311 and the second region 312. Each of the first region 311, the second region 312, and the third region 313 is a region that extends toward the plane.

The planar shape of the first region 311 and the planar shape of the second region 312 illustrated in FIG. 1 are rectangular, but are not limited to the above example. The planar shape of the first region 311 and the planar shape of the second region 312 may be changed as appropriate in accordance with, for example, the planar shapes or the like of the first piezoelectric layer 21 and the second piezoelectric layer 22. The planar shape of the third region 313 is also rectangular, but is not limited to the above example. The planar shape of the third region 313 may be changed as appropriate in accordance with, for example, the planar shape or the like of the first region 311 or the second region 312.

The first region 311 is fixed to the first piezoelectric layer 21. The second region 312 is fixed to the second piezoelectric layer 22. In contrast, the third region 313 vibrates in response to the vibration of the first piezoelectric layer 21 and the second piezoelectric layer 22. Each of the first region 311 and the second region 312 is an example of a "fixing portion." The third region 313 is an example of a "movable portion."

The main portion 31 according to the present embodiment further includes a fourth region 314 and a fifth region 315. The fourth region 314 and the fifth region 315 are also regions each of which extends toward the plane, as in the first region 311, the second region 312, and the third region 313. The planar shape of the fourth region 314 and the planar shape of the fifth region 315 are not limited to the shapes shown in FIG. 1, and may be changed as appropriate. The main portion 31 may include, for example, one or more regions, other than the first region 311, the second region 312, the third region 313, the fourth region 314, and the fifth region 315, depending on the planar shape of the main portion 31.

The fourth region 314 is disposed on the +side in the Y direction with respect to the first region 311, the second region 312, and the third region 313. The fourth region 314 overlaps both a region on the +side in the Y direction of the opening 13 and a region on the +side in the Y direction of the frame 11. In the present embodiment, the region on the +side in the Y direction of the frame 11, overlapping the fourth region 314, corresponds to the first long side portion 11a, the region on the +side in the Y direction of the first short side portion 11c, and the region on the +side in the Y direction of the second short side portion 11d.

In the fourth region 314, the region overlapping the region on the +side in the Y direction of the frame 11 is an example of a "fixing portion." In addition, in the fourth region 314, a region overlapping the region on the +side in the Y direction of the opening 13 is not constrained by the frame 11, and may vibrate in response to the vibration of the membrane 30. This region of the fourth region 314 overlapping the region on the +side in the Y direction of the opening 13 is an example of a "movable portion."

The fifth region 315 overlaps each of a region on the −side in the Y direction of the opening 13 and a region on the −side in the Y direction of the frame 11. In the present embodiment, the region on the −side in the Y direction of the frame 11, overlapping the fifth region 315, corresponds to the second long side portion 11b, the region on the −side in the Y direction of and the first short side portion 11c, and the region on the −side in the Y direction of the second short side portion 11d.

In the fifth region 315, the region overlapping the region on the −side in the Y direction of the frame 11 is an example of the "fixing portion." In the fifth region 315, the region overlapping the region on the −side in the Y direction of the opening 13 is not constrained by the frame 11, and may vibrate in response to the vibration of the membrane 30. This region of the fifth region 315 overlapping the region on the −side in the Y direction of the opening 13 is an example of the "movable portion."

The damper 32 has two surfaces that protrude upward from different positions of the main portion 31 and that are connected to each other at a top. The damper 32 according to the present embodiment has a substantially parabolic cross-sectional shape as shown in FIG. 2. However, the cross-sectional shape of the damper 32 is not limited to the above example.

The two surfaces that form the damper 32 may include, for example, inclined surfaces or curved surfaces that approach each other toward the top. As shown in FIG. 2, the inside of a region that is surrounded by the two surfaces preferably is hollow. However, when the membrane 30 vibrates, in a case where the damper 32 may deform in response to receiving a tensile force from the main portion 31 that is bonded to each of the two surfaces, the inside of the region surrounded by the two surfaces need not be hollow.

The damper 32 according to the present embodiment has a tunnel-like shape that is formed to extend in a predetermined range of the plane of the membrane 30. The damper 32 may be bent at one or more positions, or may be linear without including any bent portion or the like. The damper 32 may have the same or different width over the entire region of the damper 32.

As shown in FIG. 1, the damper 32 includes a first portion 321 and a second portion 322. The first portion 321 is formed along an end of the first thin piece portion 11e of the frame 11 on the +side in the X direction. The first portion 321 also connects the first region 311 and the third region 313 of the main portion 31. The second portion 322 is formed along an end of the frame 11 on the −side in the X direction of the second thin piece portion 11f. The second portion 322 also connects the second region 312 and the third region 313 of the main portion 31.

In this arrangement, the damper 32 is continuous with different regions of the main portion 31. In this case, when the membrane 30 vibrates, the damper 32 may be subjected to, for example, tensions in opposite directions from the respective different regions of the main portion 31. For example, in the example shown in FIG. 2, the first portion 321 of the damper 32 receives the tension directed toward the −side in the X direction, from the first region 311 of the main portion 31, and receives the tension directed toward the +side in the X direction, from the third region 313 of the main portion 31. Thus, the first portion 321 of the damper 32 is tensioned toward the +side in the X direction and the −side in the X direction, so that the first portion 321 is deformed.

Also, in response to the vibration of the membrane 30, the second portion 322 of the damper 32 receives the tension directed to the +side in the X direction from the second region 312 of the main portion 31, and receives the tension directed to the −side in the X direction from the third region 313 of the main portion 31. With this arrangement, the second portion 322 of the damper 32 is tensioned toward the +side in the X direction and the −side in the X direction, so that the second portion 322 is deformed.

When the first portion 321 and the second portion 322 of the damper 32 deform toward the +side in the X direction and the −side in the X direction, respectively, the suppression of displacement of the third region 313 in the direction perpendicular to the plane, due to both the tension from the first region 311 fixed to the first piezoelectric layer 21 and the tension from the second region 312 fixed to the second piezoelectric layer 22, can be alleviated. As a result, the third region 313 is greatly displaced at a desired frequency, and sound pressure for the sound wave that is emitted from the third region 313 can be increased. That is, sound quality of the sound wave emitted from the third region 313 can be improved.

The damper 32 further includes a third portion 323 and a fourth portion 324. The third portion 323 connects both a movable portion (the region overlapping the region on the +side in the Y direction of the opening 13) and a fixed portion (the region overlapping the region on the +side in the Y direction of the frame 11) of the fourth region 314 in the main portion 31.

The third portion 323 of the damper 32 receives tensions in opposite directions from the movable portion and the fixed portion in the fourth region 314, in response to the vibration of the membrane 30. With this arrangement, the third portion 323 of the damper 32 deforms in directions corresponding to the directions of the tensions. As a result, when the membrane 30 vibrates, suppression of the displacement of the movable portion in the fourth region 314, due to the tension from the fixed portion, can be alleviated.

The fourth portion 324 connects both a movable portion (the region overlapping the region on the −side in the Y direction of the opening 13) and a fixed portion (the region overlapping the region on the −side in the Y direction of the frame 11) of the fifth region 315 in the main portion 31.

The fourth portion 324 of the damper 32 receives tensions in opposite directions from the movable portion and the fixed portion in the fifth region 315, in response to the vibration of the membrane 30. With this arrangement, the fourth portion 324 of the damper 32 deforms in directions corresponding to tension directions. As a result, when the membrane 30 vibrates, the suppression of the displacement of the movable portion in the fifth region 315, due to the tension from the fixed portion, can be alleviated.

As shown in FIG. 1, the damper 32 according to the present embodiment preferably has a closed shape that is formed along an edge of the opening 13, which is a boundary between the frame 11 and the opening 13. With this arrangement, the suppression of the displacement of the entire movable portion of the main portion 31, due to the tension from the fixed portion, can be alleviated.

The form of the damper 32 is not limited to the closed shape. The first portion 321 and the second portion 322 of the damper 32 may receive a great tension from the main portion 31. In view of the above situation, the damper 32 preferably includes at least the first portion 321 and the second portion 322. However, the form of the damper 32 is not limited to the above example.

As described above, the damper 32 has a function of alleviating the suppression of the displacement of the movable portion in the main portion 31, due to the tension from the fixed portion. The form of the damper 32 is not limited as long as the damper has the same function as described above. Further, the membrane 30 according to the present embodiment includes one damper 32, but the number of dampers 32 may be plural. Further, when a plurality of dampers 32 are provided, each of the dampers 32 may be disposed at an appropriate position.

In the vibration device 1 according to the present embodiment, the first piezoelectric layer 21 (first drive source) and the second piezoelectric layer 22 (second drive source) are disposed on the substrate 10. In addition, the membrane 30 is disposed so as to be bonded to the first piezoelectric layer 21 and the second piezoelectric layer 22, such that the membrane 30 spans the first piezoelectric layer 21 and the second piezoelectric layer 22. With this arrangement, the size, particularly, the thickness of the vibration device 1 can be reduced. Further, the vibration device 1 can be obtained by a simple process in which the first piezoelectric layer 21, the second piezoelectric layer 22, and the membrane 30 are sequentially stacked on the substrate 10. Thus, errors in assembling the first piezoelectric layer 21, the second piezoelectric layer 22, and the membrane 30 can be reduced.

Manufacturing Method

Hereinafter, an example of the method for manufacturing the vibration device 1 will be described with reference to FIGS. 3 to 11. The method for manufacturing the vibration device 1 according to the embodiment includes a step of forming the first piezoelectric layer 21 and the second piezoelectric layer 22, a step of forming a photoresist film 60, a step of exposing the photoresist film 60, a step of removing an photosensitive portion of the photoresist film 60, a step of forming the membrane 30, and a step of removing a non-photosensitive portion of the photoresist film 60.

Figure 3:
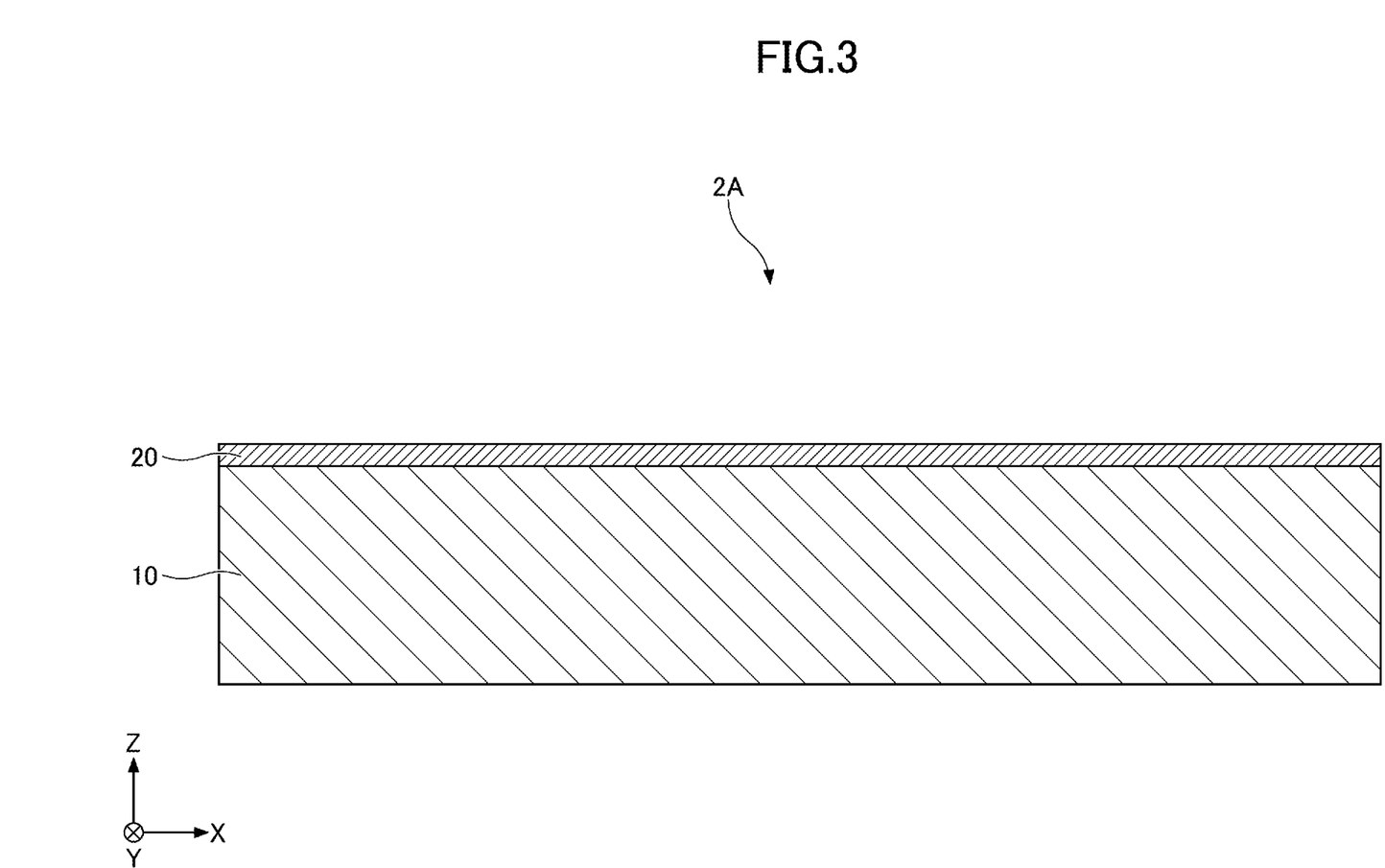
FIG. 3 is a cross-sectional view for describing a step of forming a first piezoelectric layer and a second piezoelectric layer in a method for manufacturing the vibration device according to the embodiment.
Figure 4:
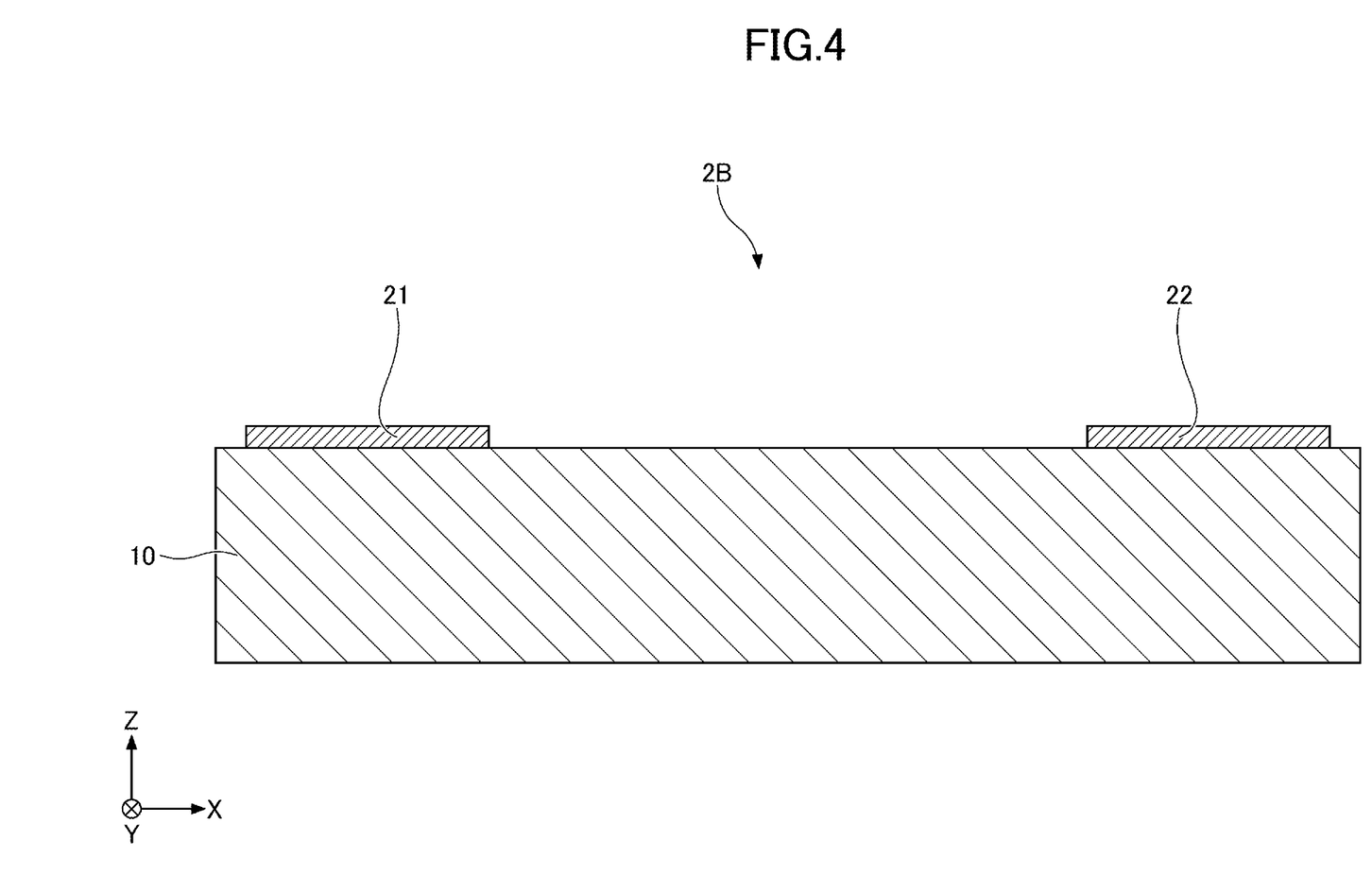
FIG. 4 is another cross-sectional view for describing the step of forming the first piezoelectric layer and the second piezoelectric layer in the method for manufacturing the vibration device according to the embodiment.
Figure 5:
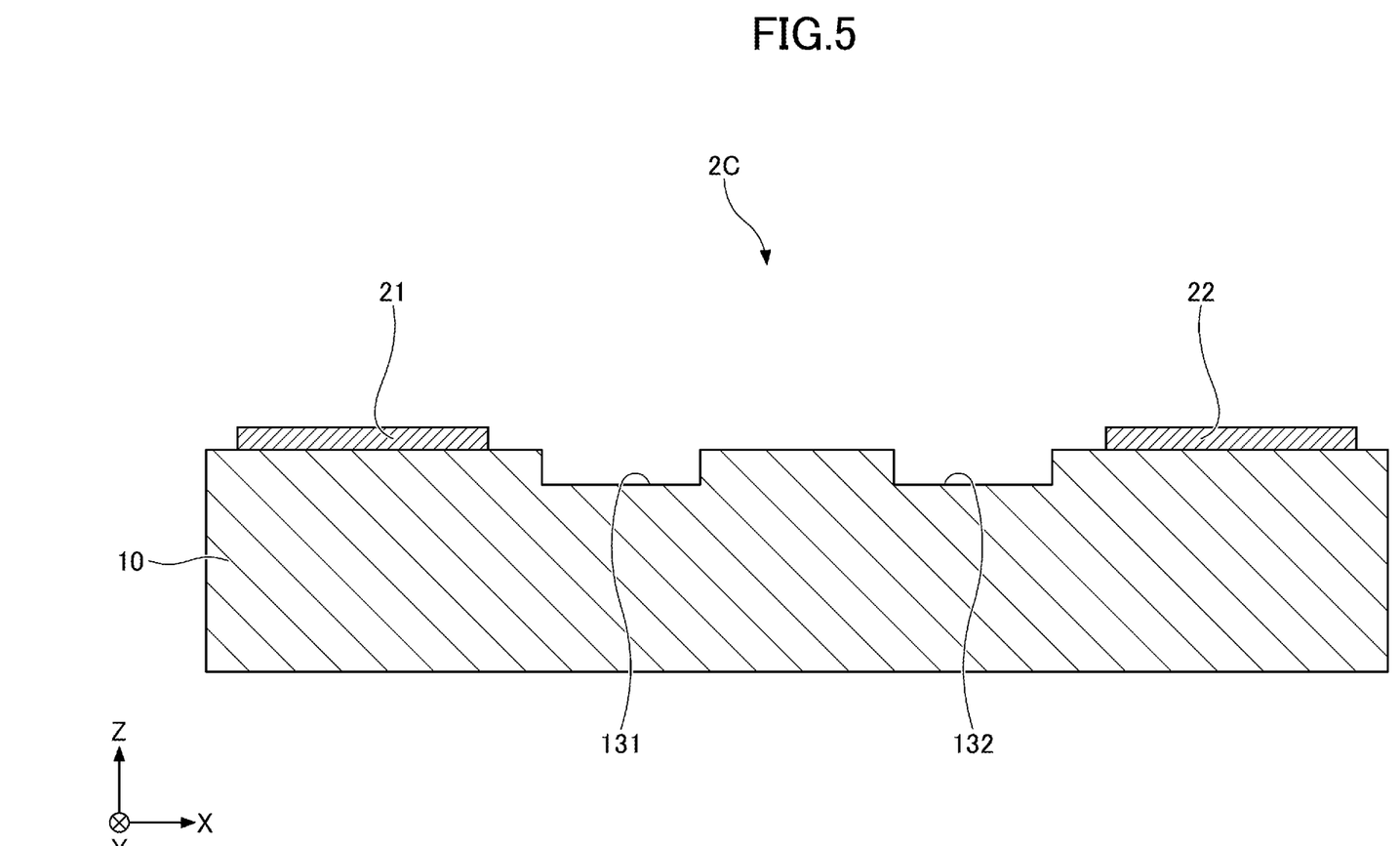
FIG. 5 is still another cross-sectional view for describing the step of forming the first piezoelectric layer and the second piezoelectric layer in the method for manufacturing the vibration device according to the embodiment.

First, the step of forming the first piezoelectric layer 21 and the second piezoelectric layer 22 will be described with reference to FIGS. 3 to 5. FIG. 3 is a cross-sectional view of a laminate 2A before forming the first piezoelectric layer 21 and the second piezoelectric layer 22. FIG. 4 is a cross-sectional view of a laminate 2B after forming the first piezoelectric layer 21 and the second piezoelectric layer 22. FIG. 5 is a cross-sectional view of a laminate 2C after forming a first recess 131 and a second recess 132 in the substrate 10.

As shown in FIG. 3, a continuous piezoelectric layer 20 that extends toward the plane is formed on the substrate 10 that is planar. With this approach, the laminate 2A is fabricated. An approach example of forming the piezoelectric layer 20 includes a dry process such as sputtering, vacuum deposition, or chemical vapor deposition (CVD). However, the approach of forming the piezoelectric layer 20 is not limited to the above dry process.

Subsequently, as shown in FIG. 4, a predetermined region of the piezoelectric layer 20 is removed to form the first piezoelectric layer 21 and the second piezoelectric layer 22 that are spaced apart from each other on the substrate 10. With this approach, the laminate 2B is fabricated. An approach example of forming the first piezoelectric layer 21 and the second piezoelectric layer 22 includes etching such as dry etching or wet etching. However, the approach of forming the first piezoelectric layer 21 and the second piezoelectric layer 22 is not limited to the above etching.

Subsequently, as shown in FIG. 5, for example, in a region between the first piezoelectric layer 21 and the second piezoelectric layer 22, the first recess 131 and the second recess 132 are formed to be recessed from the surface of the substrate 10. With this approach, the laminate 2C is fabricated. An approach example of forming the first recess 131 and the second recess 132 includes etching such as dry etching or wet etching. However, the approach of forming the first recess 131 and the second recess 132 is not limited to the above etching.

Figure 6:
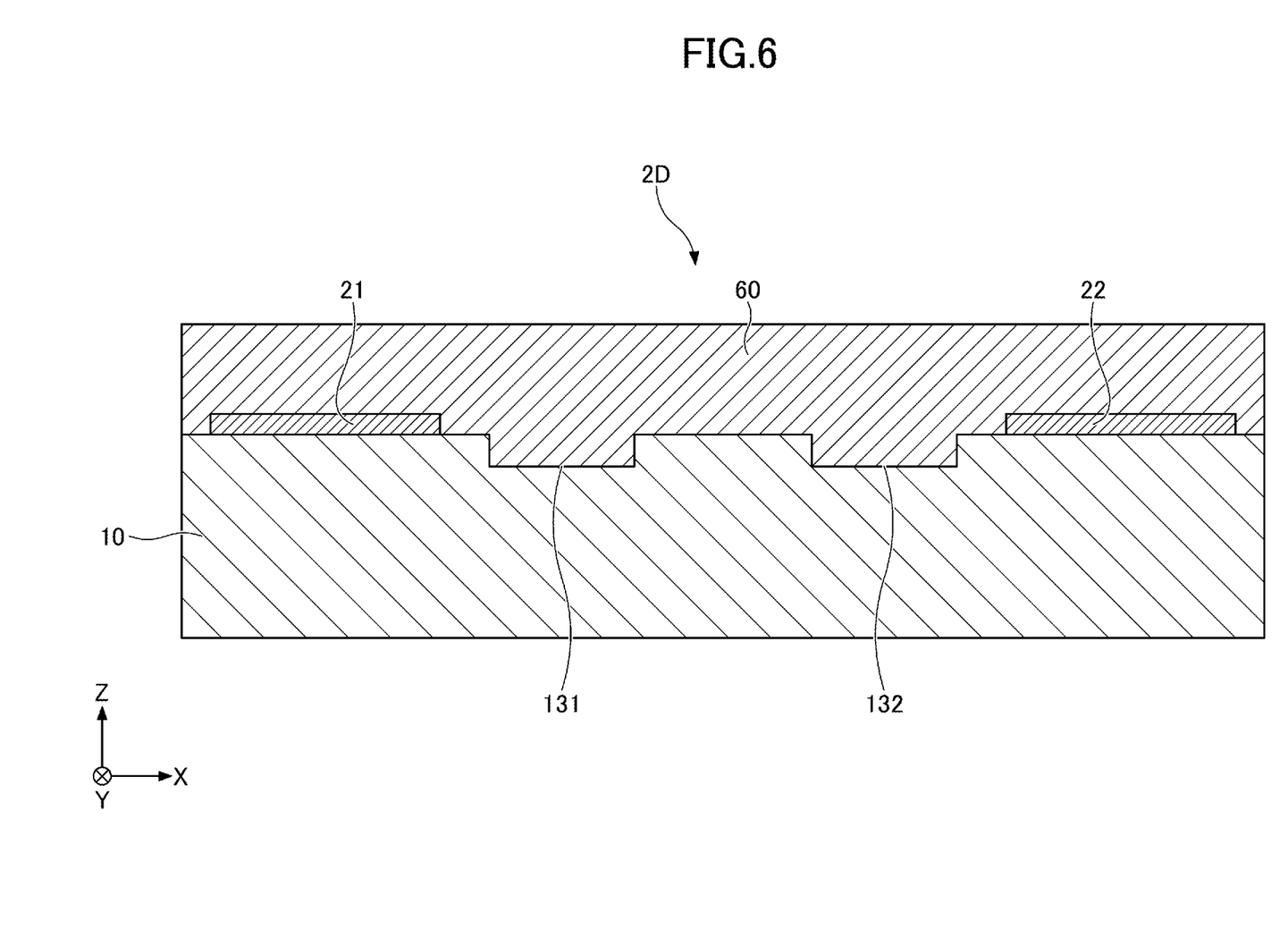
FIG. 6 is a cross-sectional view for describing a step of forming a photoresist film in the method for manufacturing the vibration device according to the embodiment.

Hereinafter, the step of forming the photoresist film 60 will be described with reference to FIG. 6. FIG. 6 is a cross-sectional view of a laminate 2D after forming the photoresist film 60. The photoresist film 60 according to the present embodiment includes a resin, a photosensitive agent, and a solvent. As shown in FIG. 6, the photoresist film 60 is formed on the substrate 10, the first piezoelectric layer 21, and the second piezoelectric layer 22. The first recess 131 and the second recess 132 of the substrate 10 are filled with the photoresist film 60. With this approach, the laminate 2D is fabricated. The photoresist film 60 may be formed by a wet process such as material jetting, spin coating, or dip coating. However, the method for forming the photoresist film 60 is not limited to the above wet process.

After forming the photoresist film 60, the laminate 2D is preferably heat-treated to cure the photoresist film 60. A temperature range of heat treatment is not limited as long as the photoresist film 60 can be cured. In an example, the temperature range is from 80° C. to 120° C.

Figure 7:
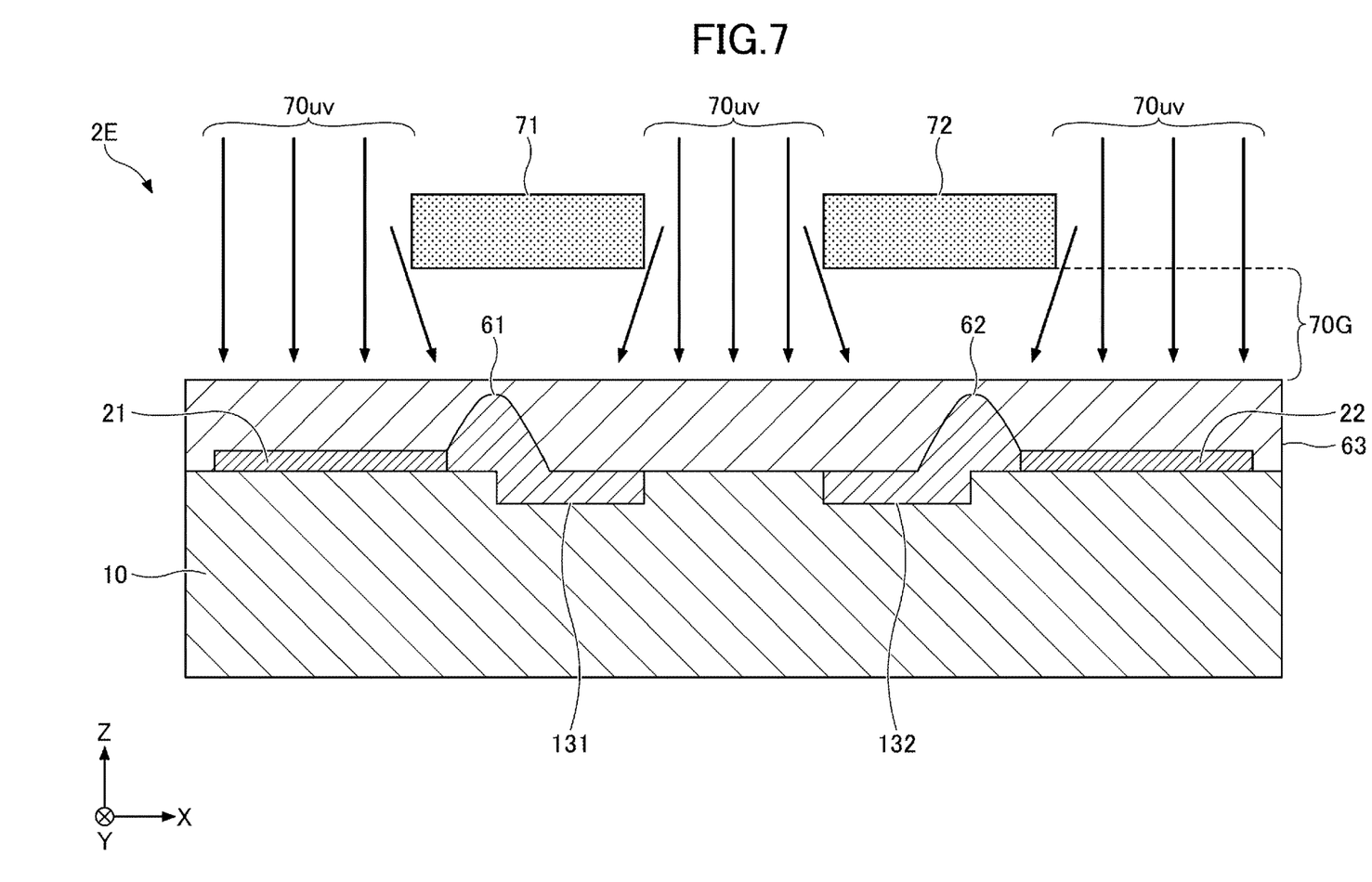
FIG. 7 is a cross-sectional view for describing a step of exposing the photoresist film in the method for manufacturing the vibration device according to the embodiment.

Hereinafter, the step of exposing the photoresist film 60 will be described with reference to FIG. 7. FIG. 7 is a cross-sectional view of a laminate 2E in a state where a first non-photosensitive portion 61, a second non-photosensitive portion 62, and a photosensitive portion 63 are formed in the photoresist film 60 through exposure. The step of exposing the photoresist film 60 is an example of a "step of forming the first non-photosensitive portion 61, the second non-photosensitive portion 62, and the photosensitive portion 63 in the photoresist film 60."

Photomasks 71 and 72 are disposed opposite the photoresist film 60. At this time, a distance between each of the photomasks 71 and 72 and the photoresist film 60 is from 40 μm to 500 μm.

With this approach, when the photomasks 71 and 72 are disposed at positions that are relatively away from the photoresist film 60, a portion of ultraviolet light 70uv that passes in proximity to the photomasks 71 and 72 is diffracted. In the following description, light of the ultraviolet light 70uv for exposure, obtained by diffracting the ultraviolet light 70uv that passes in proximity to the photomasks 71 and 72, is referred to as "diffracted light." On the other hand, light that travels straight to the photoresist film 60, of the ultraviolet light 70uv for exposure, is referred to as "straight light."

The diffracted light is obliquely incident on the surface of the photoresist film 60. The straight light is perpendicularly incident on the surface of the photoresist film 60. The intensity of the diffracted light is less than that of the straight light. That is, the diffracted light does not travel to a deep portion of the photoresist film 60. As a result, for example, one or more non-photosensitive regions with inclined surfaces are formed, as in the first non-photosensitive portion 61 and the second non-photosensitive portion 62.

Figure 8:
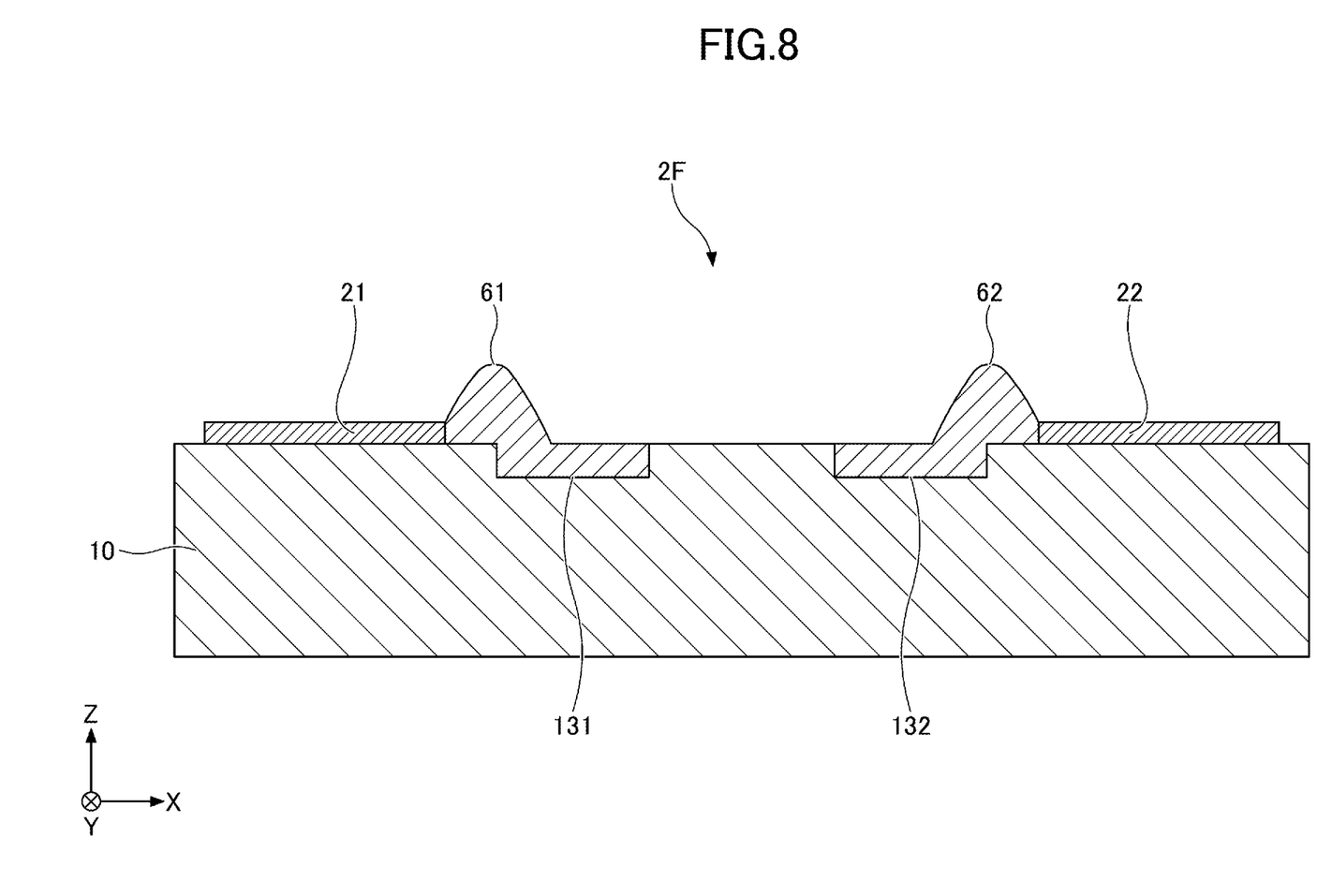
FIG. 8 is a cross-sectional view for describing a step of removing a photosensitive portion of the photoresist film in the method for manufacturing the vibration device according to the embodiment.

Hereinafter, the step of removing the photosensitive portion 63 of the photoresist film 60 will be described with reference to FIG. 8. This step corresponds to a developing step. FIG. 8 is a cross-sectional view of a laminate 2F after removing the photosensitive portion 63. As shown in FIG. 8, the photosensitive portion 63 of the photoresist film 60 is removed while leaving the first non-photosensitive portion 61, the second non-photosensitive portion 62, the first recess 131, and the second recess 132. With this approach, the laminate 2F is fabricated. As an approach example of removing the photosensitive portion 63, an approach of etching a region of the photosensitive portion 63 using a solution that dissolves the photosensitive portion 63 can be adopted. However, the approach of removing the photosensitive portion 63 is not limited to the above example.

After removing the photosensitive portion 63 of the photoresist film 60, it is preferable to further perform a step of heating the laminate 2F. By performing this step, the first non-photosensitive portion 61 and the second non-photosensitive portion 62 are heated. A heat temperature of the first non-photosensitive portion 61 and the second non-photosensitive portion 62 is preferably 20° C. to 50° C. higher than the temperature of heat treatment for curing the photoresist film 60 as described with reference to FIG. 6.

By further heating the first non-photosensitive portion 61 and the second non-photosensitive portion 62, the solvent and moisture that remain inside the first non-photosensitive portion 61 and the second non-photosensitive portion 62 volatilize. With this approach, the first non-photosensitive portion 61 and the second non-photosensitive portion 62 are shrunk. At this time, a portion of each of the first non-photosensitive portion 61 and the second non-photosensitive portion 62, close to the substrate 10, is constrained by the substrate 10, and thus a degree of shrinkage is reduced. In contrast, for the first non-photosensitive portion 61 and the second non-photosensitive portion 62, the degree of shrinkage increases in accordance with an increasing distance from the substrate 10, because a constraint imposed by the substrate 10 decreases. That is, the width of each of the first non-photosensitive portion 61 and the second non-photosensitive portion 62 decreases with the increasing distance from the substrate 10. With this arrangement, the surface of each of the first non-photosensitive portion 61 and the second non-photosensitive portion 62 is further inclined toward the substrate 10.

Figure 9:
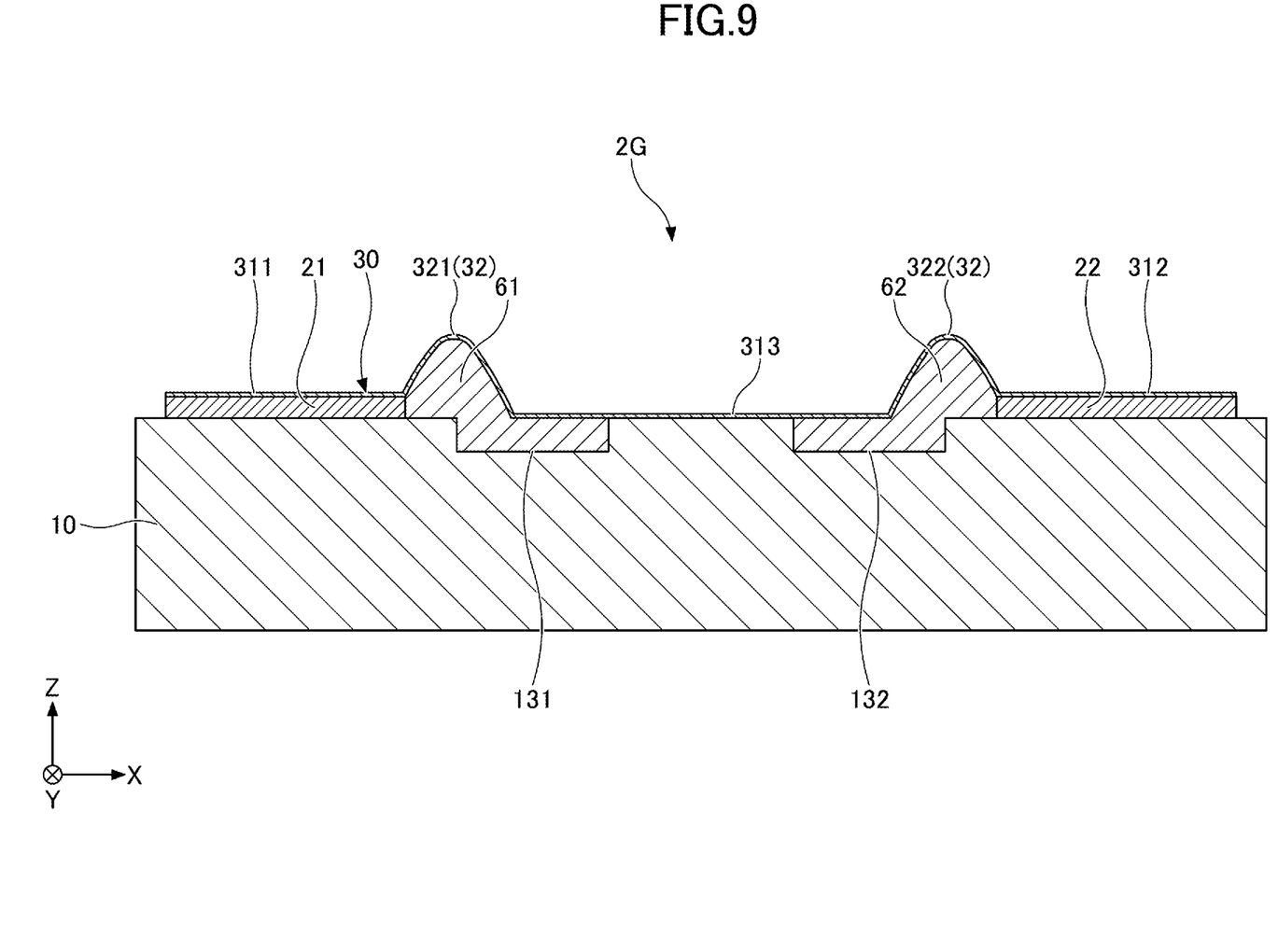
FIG. 9 is a cross-sectional view for describing a step of forming a membrane in the method for manufacturing the vibration device according to the embodiment.

Hereinafter, the step of forming the membrane 30 will be described with reference to FIG. 9. FIG. 9 is a cross-sectional view of a laminate 2G after forming the membrane 30. As shown in FIG. 9, the membrane 30 is formed on the substrate 10, the first piezoelectric layer 21, the second piezoelectric layer 22, the first non-photosensitive portion 61, and the second non-photosensitive portion 62, which are exposed by removing the photosensitive portion 63. With this approach, the laminate 2G is fabricated. The membrane 30 may be formed by a wet process such as material jetting, spin coating, or dip coating. However, an approach of forming the membrane 30 is not limited to the above wet process.

Portions of the membrane 30 that are formed on the first non-photosensitive portion 61 and the second non-photosensitive portion 62 respectively protrude so as to correspond to protruding shapes of the first non-photosensitive portion 61 and the second non-photosensitive portion 62. With this arrangement, the first portion 321 and the second portion 322 of the damper 32 are formed. Similarly, the third portion 323 and the fourth portion 324 of the damper 32 are formed. In contrast, the remaining region of the membrane 30, other than the damper 32, is formed in a flat state in which the remaining region extends toward the plan. In the membrane 30, the region extending toward the plan corresponds to the main portion 31. For example, a first region 311, a second region 312, and a third region 313 are formed as the main portion 31. The step of forming the membrane is an example of a "step of forming a damper".

Figure 10:
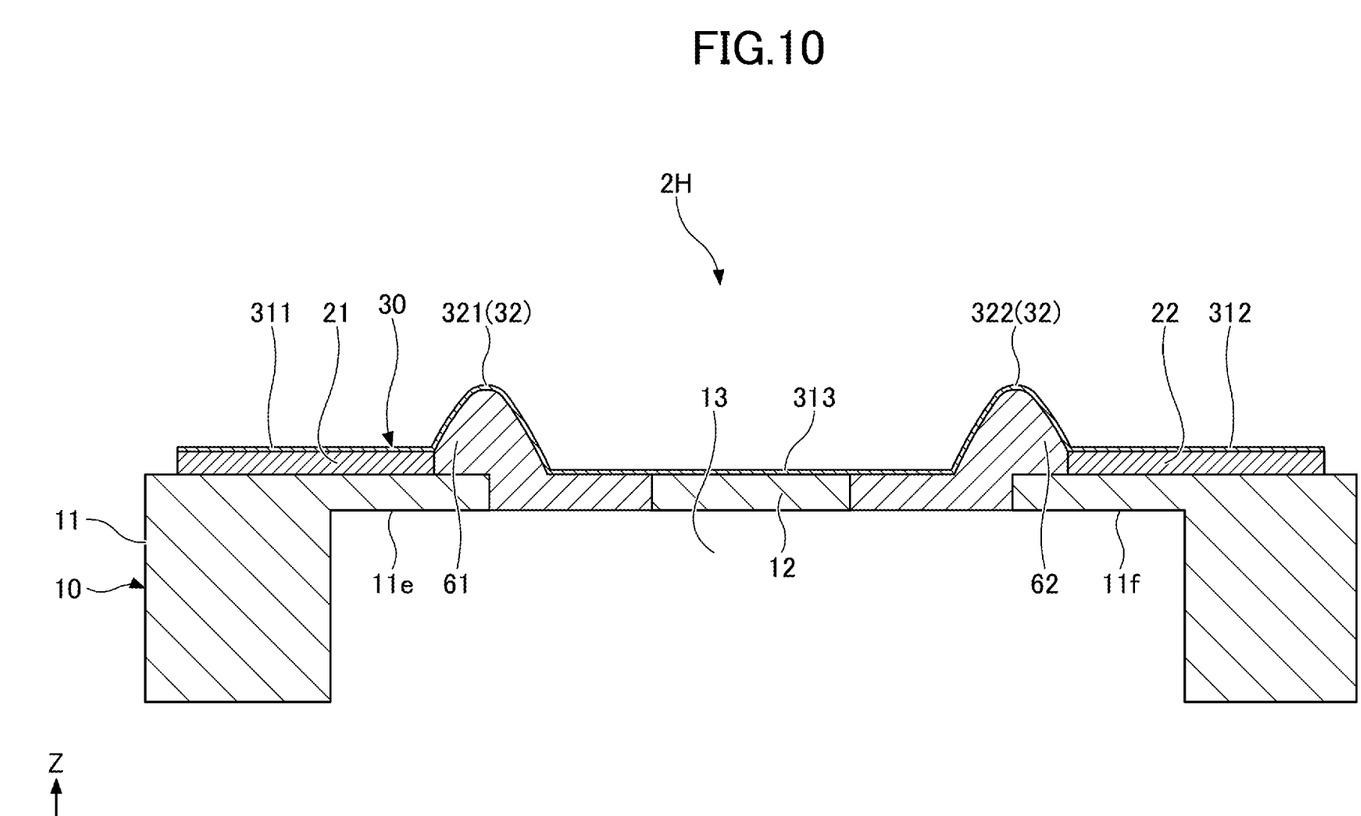
FIG. 10 is a cross-sectional view for describing a step of removing a non-photosensitive portion of the photoresist film in the method for manufacturing the vibration device according to the embodiment.
Figure 11:
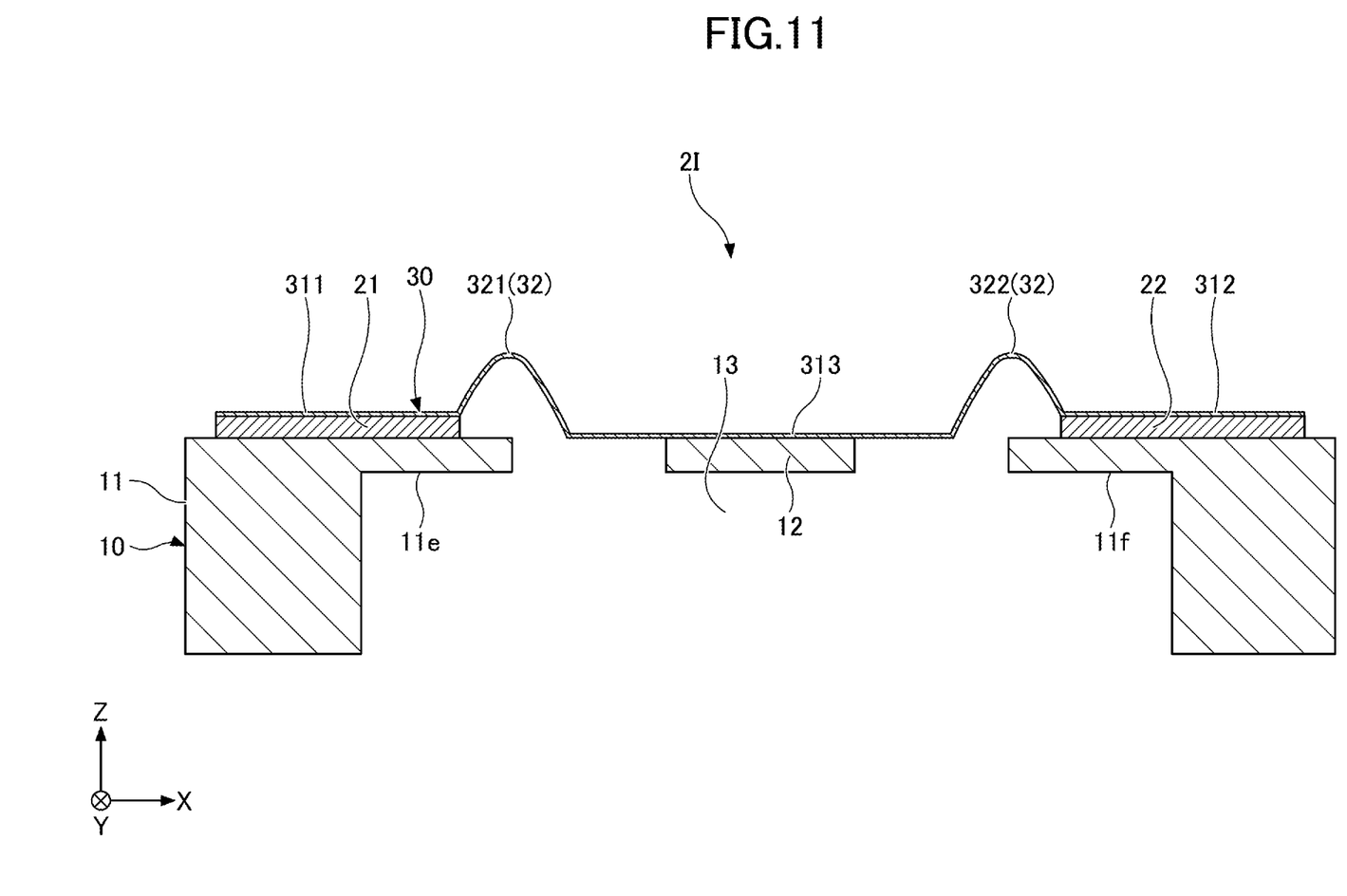
FIG. 11 is another cross-sectional view for describing the step of removing the non-photosensitive portion of the photoresist film in the method for manufacturing the vibration device according to the embodiment.

Hereinafter, the step of removing the non-photosensitive portion of the photoresist film 60 will be described with reference to FIGS. 10 and 11. FIG. 10 is a cross-sectional view of a laminate 2H after forming the opening 13 in the substrate 10. FIG. 11 is a cross-sectional view of a laminate 2I after removing the non-photosensitive portion of the photoresist film 60.

First, as shown in FIG. 10, a substantially central portion of the substrate 10 is removed to form a recessed region in the substrate 10. The recessed region corresponds to the opening 13. With this approach, the laminate 2I is fabricated. As an approach example of forming the opening 13, etching such as dry etching or wet etching is used. However, the approach of forming the opening 13 is not limited to the above etching.

Subsequently, as shown in FIG. 11, the first non-photosensitive portion 61 and the second non-photosensitive portion 62, each of which is a non-photosensitive portion of the photoresist film 60, are removed. With this approach, the inside of the first portion 321 and the second portion 322 of the damper 32 is hollow. Further, the non-photosensitive portion with which the first recess 131 is filled is removed. In addition, the non-photosensitive portion with which the second recess 132 is filled is removed. With this approach, the opening 13 passes through the substrate 10 in the direction perpendicular to the surface of the substrate 10. Thus, the laminate 2I is fabricated. The laminate 2I corresponds to the vibration device 1. As an approach example of removing the non-photosensitive portion of the photoresist film 60, an approach of etching a region of the non-photosensitive portion using a solution that dissolves the non-photosensitive portion is adopted. However, the approach of removing the non-photosensitive portion is not limited to the above example.

The vibration device 1 can be manufactured by performing the above steps. However, the method for manufacturing the vibration device 1 may include any other step(s) as appropriate.

In the method for manufacturing the vibration device 1 according to the present embodiment, the first non-photosensitive portion 61 and the second non-photosensitive portion 62 can be formed through exposure and development of an originally flat photoresist film 60. The damper 32 can be provided using molds of the first non-photosensitive portion 61 and the second non-photosensitive portion 62 of the photoresist film 60. That is, it is not necessary to separately prepare expensive equipment such as a dedicated mold, for the purpose of providing the damper 32. With this approach, in the method for manufacturing the vibration device 1 according to the present embodiment, the membrane 30 in which the damper 32 is formed can be manufactured inexpensively and simply.

Although the preferred embodiments and the like are described above in detail, the present disclosure is not limited to the above embodiments. For example, various modifications and substitutions to the above embodiments can be made without departing from the scope set forth in the present disclosure.

For example, the present disclosure relates the following aspects.

[1] In a first aspect, a vibration device includes:
  a substrate;
  a first drive source disposed on the substrate and configured to vibrate the substrate;
  a second drive source disposed on the substrate and being away from the first drive source on the substrate, the second drive source being configured to vibrate the substrate; and
  a membrane disposed on the first drive source and the second drive source and extending from the first drive source toward the second drive source, the membrane including
    a main portion extending in an in-plane direction, and
    a damper protruding in a direction perpendicular to a plane of the membrane.
  The main portion includes
  a first region disposed on the first drive source,
  a second region disposed on the second drive source, and
  a third region disposed between the first region and the second region, and
  The damper includes
  a first portion connecting the first region and the third region, and
  a second portion connecting the second region and the third region.

[2] In a second aspect, in the vibration device in the first aspect, each of the first portion and second portion includes a first end and a second end,
  the damper includes
    a third portion connecting the first portion and the second portion at respective first ends, and
    a fourth portion connecting the first portion and the second portion at respective second ends, and
  the damper has a closed shape in which the first portion, the second portion, the third portion, and the fourth portion are joined end to end.

[3] In a third aspect, in the vibration device in the second aspect, the substrate includes a frame and an opening formed inside the frame, and
  the closed shape of the damper is defined along an edge of the opening.

[4] In a fourth aspect, in the vibration device in any of the first to third aspects, the damper has a parabolic cross-sectional shape that protrudes in the direction perpendicular to the plane.

[5] In a fifth aspect, a speaker unit includes:
  a vibration device including
    a substrate;
    a first drive source disposed on the substrate and configured to vibrate the substrate;
    a second drive source disposed on the substrate and being away from the first drive source on the substrate, the second drive source being configured to vibrate the substrate; and
    a membrane disposed on the first drive source and the second drive source and extending from the first drive source toward the second drive source. The membrane includes
      a main portion extending in an in-plane direction, and
      a damper protruding in a direction perpendicular to a plane of the membrane.
  The main portion includes
  a first region disposed on the first drive source,
  a second region disposed on the second drive source, and
  a third region disposed between the first region and the second region, and
  The damper includes
  a first portion connecting the first region and the third region, and
  a second portion connecting the second region and the third region.

[6] In a sixth aspect, a method for manufacturing a vibration device includes:
  forming a first drive source and a second drive source at spaced apart positions on a substrate;
  forming a photoresist film on the substrate, the first drive source, and the second drive source;
  exposing the photoresist film under a condition in which a photomask is disposed at a predetermined distance from the photoresist film, and forming a photosensitive portion, a first non-photosensitive portion, and a second non-photosensitive portion in the photoresist film, each of the first non-photosensitive portion and the second non-photosensitive portion having a protruding shape;
  removing the photosensitive portion of the photoresist film;
  forming a membrane in a region including the first non-photosensitive portion and the second non-photosensitive portion, the region being exposed by removing the photosensitive portion, and forming a damper that protrudes to correspond to protruding shapes of the first non-photosensitive portion and the second non-photosensitive portion; and
  removing the first non-photosensitive portion and the second non-photosensitive portion.

[7] In a seventh aspect, the method for manufacturing a vibration device in the sixth aspect further includes:
  heating the first non-photosensitive portion and the second non-photosensitive portion, after removing the photosensitive portion.

In the present disclosure, a vibration device, a speaker unit, and a method for manufacturing the vibration device that is made compact and prevents the suppression of the displacement of a membrane can be provided.

What is claimed is:
1. A vibration device comprising:
  a substrate;
  a first drive source disposed on the substrate and configured to vibrate the substrate;
  a second drive source disposed on the substrate and being away from the first drive source on the substrate, the second drive source being configured to vibrate the substrate; and
  a membrane disposed on the first drive source and the second drive source and extending from the first drive source toward the second drive source, the membrane including
    a main portion extending in an in-plane direction, and
    a damper protruding in a direction perpendicular to a plane of the membrane, wherein the main portion includes
a first region disposed on the first drive source,
a second region disposed on the second drive source, and
a third region disposed between the first region and the second region, and
wherein the damper includes
a first portion connecting the first region and the third region, and
a second portion connecting the second region and the third region.

2. The vibration device according to claim 1, wherein each of the first portion and second portion includes a first end and a second end,
wherein the damper includes
a third portion connecting the first portion and the second portion at respective first ends, and
a fourth portion connecting the first portion and the second portion at respective second ends, and
wherein the damper has a closed shape in which the first portion, the second portion, the third portion, and the fourth portion are joined end to end.

3. The vibration device according to claim 2, wherein the substrate includes a frame and an opening formed inside the frame, and
wherein the closed shape of the damper is defined along an edge of the opening.

4. The vibration device according to claim 1, wherein the damper has a parabolic cross-sectional shape that protrudes in the direction perpendicular to the plane.

5. A speaker unit comprising:
a vibration device including
a substrate,
a first drive source disposed on the substrate and configured to vibrate the substrate,
a second drive source disposed on the substrate and being away from the first drive source on the substrate, the second drive source being configured to vibrate the substrate, and
a membrane disposed on the first drive source and the second drive source and extending from the first drive source toward the second drive source, the membrane including
a main portion extending in an in-plane direction, and
a damper protruding in a direction perpendicular to a plane of the membrane,
wherein the main portion includes
a first region disposed on the first drive source,
a second region disposed on the second drive source, and
a third region disposed between the first region and the second region, and
wherein the damper includes
a first portion connecting the first region and the third region, and
a second portion connecting the second region and the third region.

6. A method for manufacturing a vibration device, the method comprising:
forming a first drive source and a second drive source at spaced apart positions on a substrate;
forming a photoresist film on the substrate, the first drive source, and the second drive source;
exposing the photoresist film under a condition in which a photomask is disposed at a predetermined distance from the photoresist film, and forming a photosensitive portion, a first non-photosensitive portion, and a second non-photosensitive portion in the photoresist film, each of the first non-photosensitive portion and the second non-photosensitive portion having a protruding shape;
removing the photosensitive portion of the photoresist film;
forming a membrane in a region including the first non-photosensitive portion and the second non-photosensitive portion, the region being exposed by removing the photosensitive portion, and forming a damper that protrudes to correspond to protruding shapes of the first non-photosensitive portion and the second non-photosensitive portion; and
removing the first non-photosensitive portion and the second non-photosensitive portion.

7. The method for manufacturing a vibration device according to claim 6, further comprising:
heating the first non-photosensitive portion and the second non-photosensitive portion, after removing the photosensitive portion.

* * * * *